Nov. 28, 1967  J. W. PARKS ET AL  3,355,020
SEWAGE TREATMENT SYSTEM
Filed Feb. 17, 1965  2 Sheets-Sheet 1
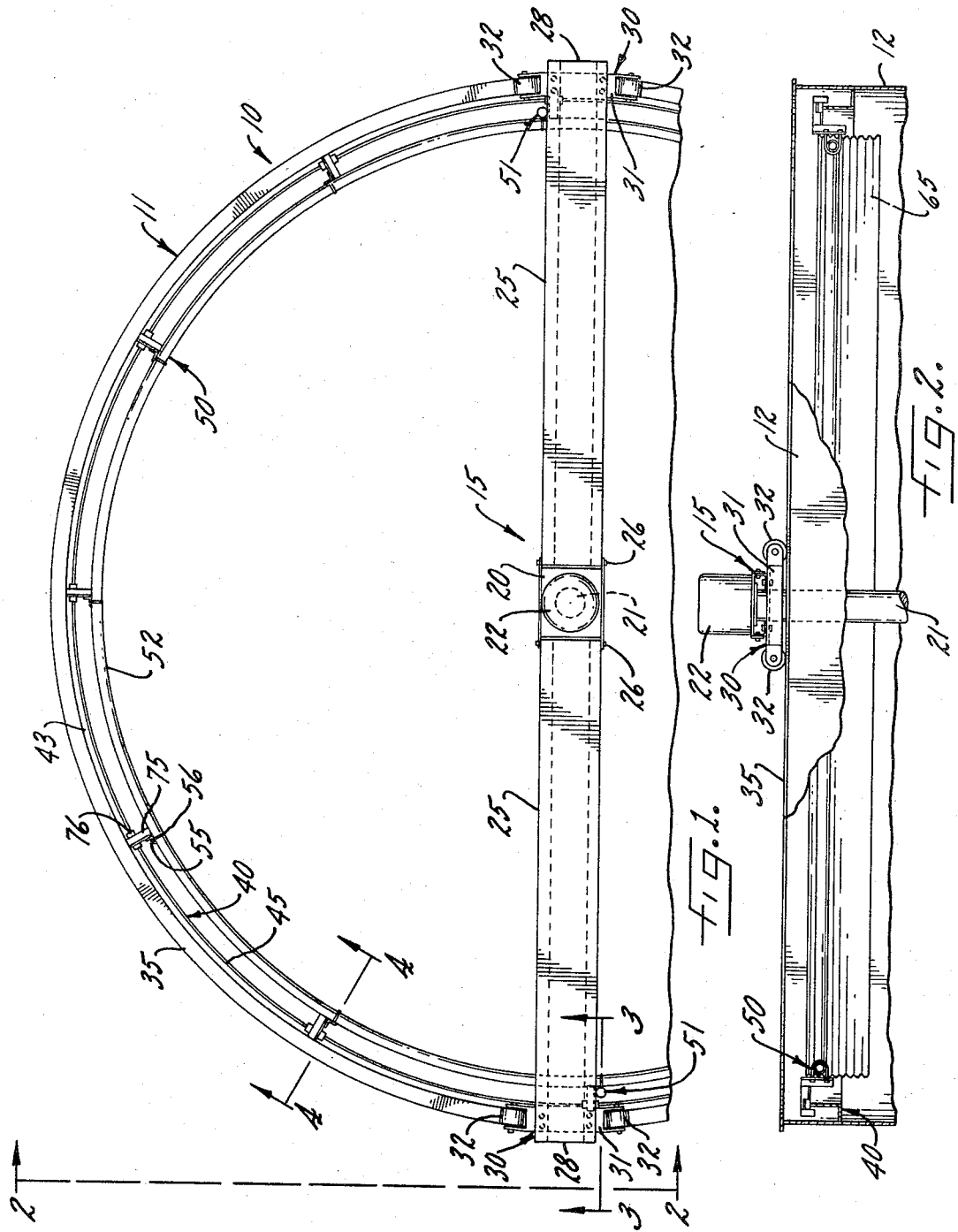
INVENTORS.
JOHN W. PARKS
RALPH A. OLSON
MARVIN E. WOOD
BY *Hume, Groen, Clement & Hume*
ATTORNEYS.

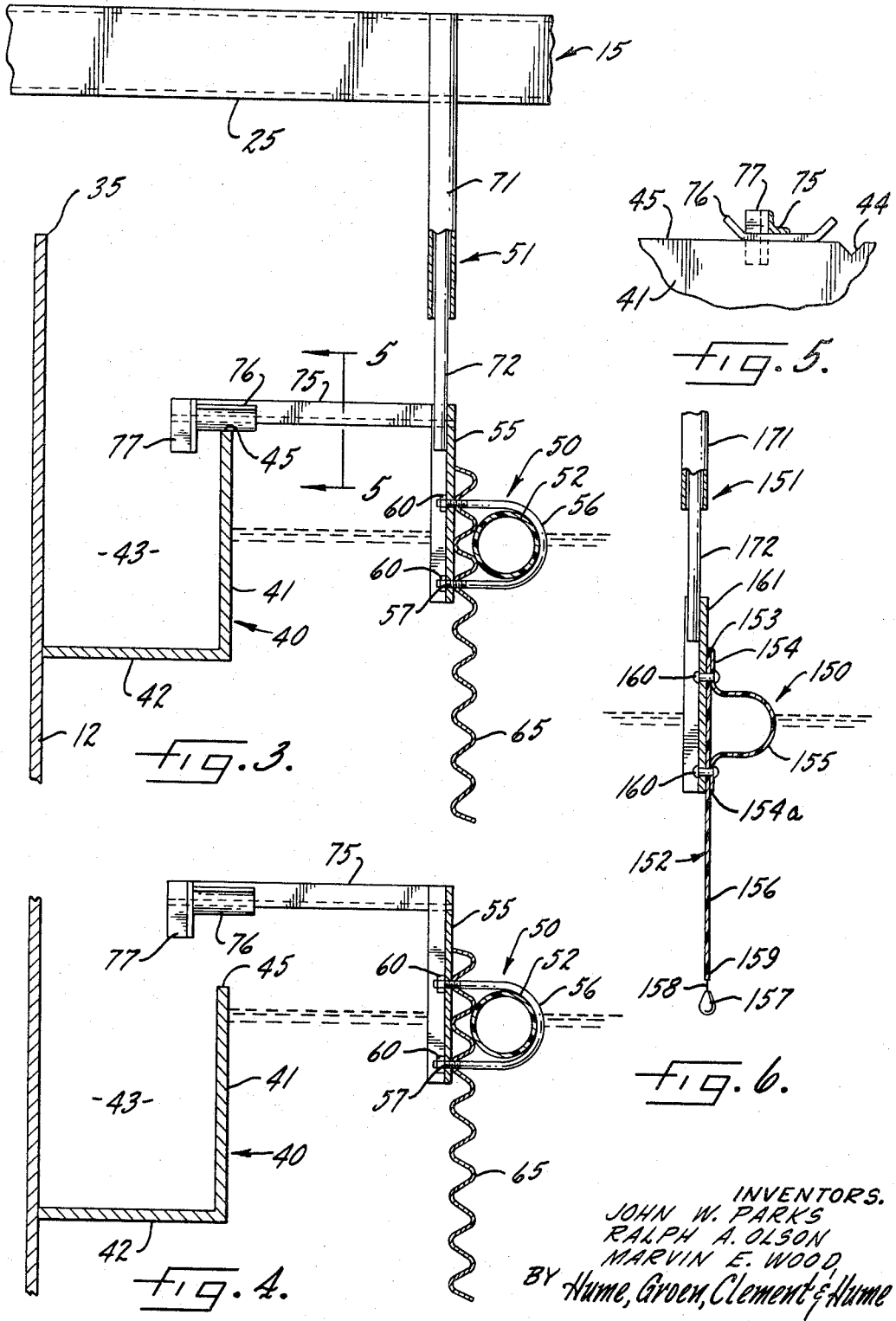

United States Patent Office 3,355,020
Patented Nov. 28, 1967

3,355,020
SEWAGE TREATMENT SYSTEM
John W. Parks, Overland Park, Kans., Ralph A. Olson, Kansas City, Mo., and Marvin E. Wood, Lawrence, Kans., assignors to Union Tank Car Company, Chicago, Ill., a corporation of New Jersey.
Filed Feb. 17, 1965, Ser. No. 433,313
13 Claims. (Cl. 210—121)

This invention relates in general to sewage treatment, and more particularly to a clarifier tank in a sewage treatment system. It deals specifically with the handling of effluent liquid and floating scum in a sewage clarifier tank.

In the type of sewage treatment system in question, a clarifier tank normally defines one stage in a multi-stage sewage treatment operation. The clarifier tank receives a "mixed liquor" from an initial stage aeration tank. Solids are separated from liquid by settling in the clarifier, and the liquid is removed as effluent from the system and disposed of. Sludge comprising the accumulated solids is ordinarily moved to use in the next aeration stage of the sewage treatment.

As the solids separate from the effluent by settling in the clarifier tank, very light solids tend to float to the top of the liquid and form a scum on its surface. This scum is preferably collected from the liquid surface and discharged from the tank. At the same time, however, it is conventional to use a scum baffle arrangement to contain that scum which has a tendency to flow over the effluent weir and contaminate the discharged effluent.

It is an object of the present invention to provide a new and improved scum baffle arrangement for preventing the flow of floating scum over the effluent weir in a sewage treatment clarifier or the like.

It is still another object to provide a scum baffle arrangement which rotates with travelling bridge on the clarifier tank and floats on the surface of the clarifier liquid whereby ice which forms on the surface during winter operation and moves with the bridge does not damage the baffle arrangement.

It is yet another object to provide a floating scum baffle arrangement of the aforedescribed character which facilitates vertical lost motion travel of the baffle relative to the rotating bridge to assure that the baffle arrangement is constantly maintained in its optimum operational relationship.

It is a further object to provide a floating scum baffle arrangement which does not become water logged to destroy its floating characteristic during operation of the clarifier.

The foregoing and other objects are realized in accord with the present invention by providing, in a sewage treatment clarifier, a scum baffle which floats on the surface of the clarifier tank. The baffle is connected to the rotating bridge in vertical lost motion relationship so that it can readily rise and sink with the level of liquid in the clarifier and, consequently, provide a constant depth baffle.

In one embodiment of the invention, the tank can be dewatered and the baffle will sink only to a predetermined level where it is supported until the liquid level in the clarifier tank rises again when the tank is put back in operation. In another embodiment, the baffle is permitted to sink to the clarifier floor when the tank is dewatered.

The invention, both as to its organization and method of operation, taken with further objects and advantages thereof, will best be understood by reference to the following description taken in connection with the accompanying drawings, in which:

FIGURE 1 is a partial plan view of a clarifier tank incorporating a scum baffle arrangement embodying features of one embodiment of the present invention;

FIGURE 2 is a side elevational view of the tank taken along line 2—2 of FIGURE 1, partially in section, and with parts removed;

FIGURE 3 is a sectional view taken along line 3—3 of FIGURE 1 showing the tank partially dewatered;

FIGURE 4 is a sectional view taken along line 4—4 of FIGURE 1, with the clarifier liquid illustrated at operating level;

FIGURE 5 is a sectional view taken along line 5—5 of FIGURE 3; and,

FIGURE 6 is a sectional view through a scum baffle arrangement incorporating features of another embodiment of the present invention.

Referring now to the drawings, and particularly to FIGURES 1 and 2, a portion of a sewage treatment clarifier is illustrated generally at 10. The clarifier 10 includes a tank 11 having a circular cylindrical outer wall 12 and a rotating bridge 15 mounted above the wall. The rotating bridge 15 includes a central platform section 20 rotatably mounted on the vertically disposed central column 21 extending upwardly from the floor (not shown) of the tank 11. A conventional electric motor 22 of suitable horsepower mounted on the section 20 is connected to the column 21 in a well-known manner to rotate the section 20 and, accordingly, the bridge 15 about a vertical axis defined by the column.

The bridge 15 includes two identical wing sections 25 hinged to the central platform section 20 on transversely extending horizontal axes 26. The outer end 28 of each wing section 25 extends radially over the wall 12 of the tank 11 and mounts a roller assembly 30 which is adapted to ride on the wall 12 and support the outer end of the wing section as the bridge 15 rotates.

Each roller assembly 30 comprises a conventional wheel truck 31 having a pair of laterally spaced rollers 32 journaled thereon. The rollers 32 are adapted to ride on the upper edge 35 of the tank wall 12.

Mounted on the inside of the tank wall 12 and extending inwardly therefrom is a "90° V-notch" liquid effluent weir assembly 40. The weir assembly 40 comprises a circular cylindrical wall 41 and a floor 42 fabricated of sheet material and secured to the wall 12 to form a trough 43 for effluent liquid being drawn from the tank 11. A series of V-notches are formed in the upper edge 45 of the wall 41 in a well-known manner to provide controlled egress of the effluent liquid.

In the illustrated sewage treatment system, mixed liquor (liquid and some solids after aeration) enters the clarifier 10 through an inlet (not shown) in the column 21 in a well-known manner. Sludge is separated from liquid in the tank 11 by settling and effluent is removed from the tank 11 by passing over the V-notches 44 in the upper edge 45 of the wall 41. The effluent is removed from the trough 43 and disposed of in a well-known manner.

To prevent the passage of floating scum and the like through the V-notch 44 of the wall 41 into the trough 43, a scum baffle arrangement 50 embodying features of one embodiment of the present invention is floated on the surface of the liquid in the clarifier 10 immediately adjacent the wall 41 of the effluent weir 40. The scum baffle arrangement extends entirely around the inner periphery of the tank wall 12 immediately adjacent the wall 41 and is connected in vertical lost motion relationship by identical connector assemblies 51 to each rotating bridge wing 25, for rotation with the bridge 15.

The lost motion relationship of the connector assemblies 51 permits the scum baffle arrangement 50 to ride freely on the surface of the liquid in the clarifier 10 through minor variations in the distance between the bridge wing sections 25 and the surface of the liquid. The scum baffle arrangement 50 is positioned closely adjacent the wall 41 and, accordingly, virtually all the scum which accumulates on the surface of the liquid in the clarifier 10 does so within its circular confines. The baffle arrangement 50 prevents this scum from passing over the upper edge 45 of the weir wall 41 into the trough 43.

The scum baffle arrangement 50 includes a hollow tube 52 formed of plastic or the like extending around the interior of the tank 11 on the surface of the clarifier liquid. The tube 52 floats on the liquid surface and supports the entire scum baffle assembly 50 in floating relationship. The tube is preferably supplied with air under slight pressure from any suitable source (not shown) to prevent leakage which might develop causing the tube to become water logged and the scum baffle arrangement 50 to sink below the surface of the clarifier liquid. The size of the tube 52 is dependent upon the buoyancy required, and varies with different applications.

The hollow plastic tube 52 is secured to a plurality of vertically disposed angle iron members 55 at spaced intervals around its periphery, as illustrated best in FIGURE 1. U-clamps 56 extend through suitably formed apertures 57 in the angle iron members 55 and conventional nuts 60 on their threaded free ends secure the clamp and, consequently, the plastic tube 52 to each member 55.

Secured between the plastic tube 52 and each member 55 by the U-clamps 56, and extending around the entire periphery of the tank 11, is a scum baffle 65 formed of corrugated aluminum or plastic or the like. The corrugated baffle 65 extends slightly above the tube 52, and approximately three to eighteen inches below the tube.

It will thus be seen that as long as the tube 52 floats on the surface of the liquid in the clarifier 10, scum within the confines of the circular scum baffle 65 cannot pass outwardly over the wall 41 with the effluent liquid. Consequently, the effluent liquid is not contaminated and can be disposed of in a conventional manner. Since the circumference of the circle tube formed by the tube 52 is such that it floats immediately adjacent the wall 41, virtually no scum can rise to the surface of the liquid between the wall and the scum baffle 65 and pass over the V-notches 44.

The scum baffle arrangement 50 is connected to and rotates with the rotating bridge 15, as has been pointed out. The lost motion connection assemblies 51 which connect it to the bridge 15 are best illustrated in FIGURE 3. One of these connector assemblies 51 is provided adjacent the outer end of each of the wing sections 25 of the rotating bridge 15 and includes a vertically depending hollow sleeve 71 secured to the leading edge of a corresponding section 25 by welding or the like. Vertically extending pins 72 secured by welding or the like to suitable angle iron members 55 slide in telescoping relationship in each of the sleeves 71.

The connector assemblies 51 facilitate relative vertical movement between the bridge sections 25 and the scum baffle arrangement 50. Accordingly, slight irregularities in the track surface 35 upon which the wing sections 25 of the bridge roll on wheel trucks 30 do not cause the scum baffle 65 to be forced below the surface of the clarifier liquid, or drawn above the surface; the baffle consistently floats freely on the surface of the liquid. When ice forms on the liquid surface during the winter and occasionally forces the wing sections 25 up, this feature is also significant. The wing sections 25 being hinge-supported for pivotal movement around their axes 26 adjacent the center section 20 of the bridge 15, any irregular vertical movement of the bridge sections 25 is readily accommodated.

When the clarifier tank 10 is dewatered, the scum baffle arrangement 50 obviously tends to descend with the liquid surface as it goes down. To prevent the baffle arrangement coming to rest on the rigid but not rugged corrugated aluminum or plastic baffle 65, radially extending angle iron hanger members 75 are secured to the vertical angle iron members 55 and extend outwardly over the wall 41. The hanger members have bearing plates 76 mounted adjacent their outer ends for resting on the upper edge 45 of the wall 41 when the baffle arrangement 50 has lowered sufficiently. Each hanger member 75 has a depending retainer element 77 fixed on its free end to prevent the members 55 being drawn inwardly off the wall 41 once the scum baffle arrangement 50 has come to rest on the weir 40.

As the liquid level descends in the clarifier 10 when it is being dewatered for maintenance, for example, the bearing plates 76 come to rest on the upper surface 45 of the wall 41, as illustrated in FIGURE 3. Continued dewatering results in the entire scum baffle 50 being suspended above the floor of the clarifier 10. The connector assembly 26 pins 72 and sleeves 71 are still in telescoped relationship. Refilling the tank 10 with the liquid up to the level of the weir 40 once more floats the baffle arrangement 50 into operative relationship.

Turning to FIGURE 6, a floating scum arrangement embodying features of a second form of the present invention is illustrated generally at 150. The scum baffle arrangement 150 is designed, like the aforedescribed scum baffle arrangement 50, to float on the surface of the clarifier liquid. However, in contrast to the arrangement 50, it is designed to sink to the floor (not shown) of the clarifier tank 10 and rest thereon when the tank is dewatered. To this end, the scum baffle arrangement 150 is constructed so that it will readily come to rest on the floor without being damaged.

The scum baffle arrangement 150 comprises a continuous flat sheet of material plastic, or cloth plastized to make it impervious to fluids. The upper edge 153 of the sheet 152 is folded downwardly as at 154, and sealed to the inner surface of the sheet as at 154a by any suitable sealing method to form continuous inflatable tube 155.

The tube is preferably pressurized from the aforementioned air source (not shown) similarly to the rigid plastic tube 50 hereinbefore described in relation to the first embodiment of the present invention. The tube 155 floats on the surface of the clarifier liquid and will not collapse if small leaks develop. The free lower portion 156 of the sheet 152 depends from its joinder at 154a with the tube 155 to a distance of approximately 18 inches below the tube. Weight in the form of lead weights 157 secured in spaced relationship to the lower edge 159 of the portion 156 by suitable links 158 hold the portion 156 down so that it acts as an effective baffle at all times. In the alternative, however, the weights might be embedded in the sheet 152, or the sheet itself integrally weighted.

Spaced 180° from each other on the outer periphery of the tube 155 and secured to the sheet 152 both above and below the tube by conventional rivets 160 are vertically extending angle iron members 161. A connector assembly 151 interconnects a corresponding angle iron member 161 with each of the wing sections 25 of the rotating bridge 15 so that the scum baffle 150 rotates with the bridge 50 in floating on the surface of the clarifier liquid. The connector assemblies 151 provide vertical lost motion connections between the bridge 15 and the baffle.

Each connector assembly 151 includes a cylindrical sleeve 171 welded to and depending from the leading edge of each of the bridge wing sections 25 adjacent their outer peripheries. Corresponding pins 172 are welded to the angle iron segments 161 and telescope inwardly into the sleeves 171 to provide the vertical lost motion connection between the baffle and the rotating bridge 15. Accordingly, the scum baffle 150 floats in operational relationship on the surface of the clarifier liquid regardless of slight variations in the vertical relationship between the tube 155 and the bridge wing sections 25.

What is claimed is:

1. In a sewage treatment tank having a cylindrical wall with a rotating bridge surmounting said wall and a cylindrical weir mounted internally of the wall for controlling the passage of effluent liquid from the tank, a scum baffle arrangement comprising: generally circular bouyant means having a diameter slightly smaller than the cylindrical weir and adapted to float on liquid in the tank, baffle means associated with said bouyant means, said baffle means and bouyant means being vertically movable with the liquid level in the tank so that said baffle means prevents the passage of floatable material over the weir, and mounting means for connecting said bouyant means to the rotating bridge for rotation therewith.

2. The scum baffle arrangement of claim 1 further characterized in that said bouyant means comprises a tubular member containing gas under pressure.

3. The scum baffle arrangement of claim 1 further characterized in that said mounting means includes a lost motion connection for facilitating a vertical movement between said bouyant means and the rotating bridge as said scum baffle arrangement rotates with the bridge.

4. The scum baffle arrangement of claim 3 further characterized in that said mounting means includes tubular means adapted to be secured to the rotating bridge, and vertically extending pin means slidable in said tubular means and connected to said bouyant means.

5. In a sewage treatment tank having a cylindrical wall with a rotating bridge surmounting said wall and a cylindrical weir mounted internally of the wall for controlling the passage of effluent liquid from the tank, a scum baffle arrangement, comprising: a generally circular tubular member having a circumference slightly smaller than the weir and adapted to float on liquid in the tank, said tubular member fabricated of relatively rigid material, a generally cylindrical baffle formed of relatively rigid material connected to and depending from said tubular member, said baffle means and bouyant means being vertically movable with the liquid level in the tank so that said baffle means prevents the passage of floatable material over the weir, and mounting member for connecting said tubular member to the bridge for rotation therewith.

6. The scum baffle of claim 5 further characterized by and including hanger means extending from said generally circular tubular member outwardly over the effluent weir, said hanger means adapted to catch and rest on the weir when the liquid level is lowered below a predetermined point to support said tube in connection with the rotating bridge.

7. The scum baffle arrangement of claim 5 further characterized in that said tube is connected to a source of gas under pressure to maintain a slightly positive pressure therein.

8. In a sewage treatment tank having a cylindrical wall with a rotating bridge surmounting said wall and a cylindrical weir mounted internally of the wall for controlling the passage of effluent liquid from the tank, a scum baffle arrangement comprising a generally circular plastic tube having a circumference slightly smaller than the weir and adapted to float on the liquid in the tank, generally cylindrical scum baffle means formed of relatively rigid material connected to said tube and depending from the tube, said baffle means and bouyant means being vertically movable with the liquid level in the tank so that said baffle means prevents the passage of floatable material over the weir, mounting means including lost motion connection means for connecting said tube to the bridge for rotation therewith, and a plurality of hanger brackets connected to said baffle means and to said tubular member and extending radially outwardly therefrom over the weir to catch and rest on the weir when the liquid level in the tank is lowered below a predetermined point during de-watering or the like to support the scum baffle arrangement in connection with the bridge.

9. The scum baffle arrangement of claim 8 further characterized in that said relatively rigid baffle means is formed of corrugated material.

10. The scum baffle arrangement of claim 8 further characterized in that said lost motion connection means includes tubular means adapted to be connected to the rotating bridge and pin means extending upwardly from said tube and slidable in said tubular means.

11. In a sewage treatment tank having a cylindrical wall with a rotating bridge surmounting said wall and a cylindrical weir mounted internally of the wall for controlling the passage of effluent liquid from the tank, a scum baffle arrangement comprising: generally circular bouyant means having a circumference slightly smaller than the weir and adapted to float on liquid in the tank, said bouyant means comprising a circular tube formed of a sheet of flexible material and filled with gas under pressure, said sheet of flexible material having a generally cylindrical portion depending therefrom to form baffle means for preventing the passage of floatable material over the weir, and mounting means for connecting said bouyant means to the bridge for rotation therewith in vertical lost motion relationship.

12. The scum baffle arrangement of claim 11 further characterized by and including weight means connected to said depending portion of said sheet to maintain said generally cylindrical portion in taut depending relationship.

13. The scum baffle arrangement of claim 11 further characterized in that said lost motion mounting means includes tubular means adapted to be connected to the rotating bridge and pin means connected to said tube and extending upwardly therefrom into slidable relationship with said tubular means.

References Cited

UNITED STATES PATENTS

| 1,397,891 | 11/1921 | Jones | 210—242 X |
| 2,095,394 | 10/1937 | Morehead | 210—242 |
| 2,106,549 | 1/1938 | Coulter | 209—465 |
| 2,202,772 | 5/1940 | Durvin | 210—242 X |
| 2,780,361 | 2/1957 | Evans et al. | 210—525 X |
| 2,801,007 | 7/1957 | Thompson. | |
| 3,244,284 | 4/1966 | Shaffer | 210—242 X |

REUBEN FRIEDMAN, *Primary Examiner.*

C. DITLOW, *Assistant Examiner.*